United States Patent
Munive

(10) Patent No.: US 9,010,769 B1
(45) Date of Patent: Apr. 21, 2015

(54) SHOPPING CART ATTACHMENT FRAME APPARATUS

(71) Applicant: Guillermo Munive, Fulshear, TX (US)

(72) Inventor: Guillermo Munive, Fulshear, TX (US)

(*) Notice: Subject to any disclaimer, the term of this patent is extended or adjusted under 35 U.S.C. 154(b) by 0 days.

(21) Appl. No.: 14/062,459

(22) Filed: Oct. 24, 2013

Related U.S. Application Data

(60) Provisional application No. 61/717,868, filed on Oct. 24, 2012.

(51) Int. Cl.
*B62B 3/14* (2006.01)

(52) U.S. Cl.
CPC ............... *B62B 3/144* (2013.01); *Y10S 280/04* (2013.01)

(58) Field of Classification Search
CPC ....................................................... B62B 3/144
USPC ............... 280/33.992, 33.993, 204, 292, 495, 280/498, 762, 769, DIG. 4
See application file for complete search history.

(56) References Cited

U.S. PATENT DOCUMENTS

| | | | | |
|---|---|---|---|---|
| 188,857 A | * | 3/1877 | Clay | 135/44 |
| 4,305,601 A | * | 12/1981 | Berge | 280/304.1 |
| 4,771,840 A | * | 9/1988 | Keller | 180/11 |
| 5,312,122 A | * | 5/1994 | Doty | 280/33.992 |
| 5,495,866 A | * | 3/1996 | Lu | 135/48 |
| 5,544,904 A | | 8/1996 | Maher | |
| 5,823,548 A | * | 10/1998 | Reiland et al. | 280/33.993 |
| 5,848,797 A | * | 12/1998 | Paez | 280/33.993 |
| 6,098,492 A | * | 8/2000 | Juchniewicz et al. | 74/551.3 |
| 6,572,122 B2 | | 6/2003 | Johnson et al. | |
| 6,575,480 B2 | * | 6/2003 | McKelvey | 280/33.993 |
| 6,679,506 B2 | | 1/2004 | Koppes et al. | |
| 6,702,313 B2 | | 3/2004 | Forshee et al. | |
| 7,093,841 B2 | | 8/2006 | Conrad | |
| 7,226,059 B1 | * | 6/2007 | Samuels | 280/33.992 |
| D549,919 S | | 8/2007 | Ash et al. | |
| 7,493,908 B2 | | 2/2009 | Carter et al. | |
| 7,494,135 B2 | | 2/2009 | Ash et al. | |
| 7,644,937 B2 | | 1/2010 | Giampavolo et al. | |
| 8,403,343 B1 | * | 3/2013 | Seawel | 280/33.992 |
| 2003/0102653 A1 | | 6/2003 | Koppes et al. | |
| 2003/0218312 A1 | * | 11/2003 | Forshee et al. | 280/304.1 |
| 2005/0242549 A1 | | 11/2005 | Longenecker et al. | |
| 2008/0143067 A1 | * | 6/2008 | Wicka | 280/47.11 |
| 2008/0169620 A1 | * | 7/2008 | Pierce | 280/33.993 |
| 2012/0048316 A1 | * | 3/2012 | Fournillier | 135/16 |

OTHER PUBLICATIONS

"The Random Tandem Connection" http://www.convaid.com/random-tandem-connection-p-1218-I-en.html.

* cited by examiner

*Primary Examiner* — John Walters
*Assistant Examiner* — Brian Swenson
(74) *Attorney, Agent, or Firm* — Garvey, Smith, Nehrbass & North, L.L.C.; Mackenzie D. Rodriguez; Seth M. Nehrbass

(57) ABSTRACT

A baby stroller that has a frame incorporated on it, which allows the baby stroller to be attached to a shopping cart in a manner that allows both the stroller and cart to be operated simultaneously by a single user. A frame that can be attached to a standard baby stroller, for connecting the stroller to a shopping cart, which allows the baby stroller and shopping cart to be operated simultaneously by a single user.

6 Claims, 10 Drawing Sheets

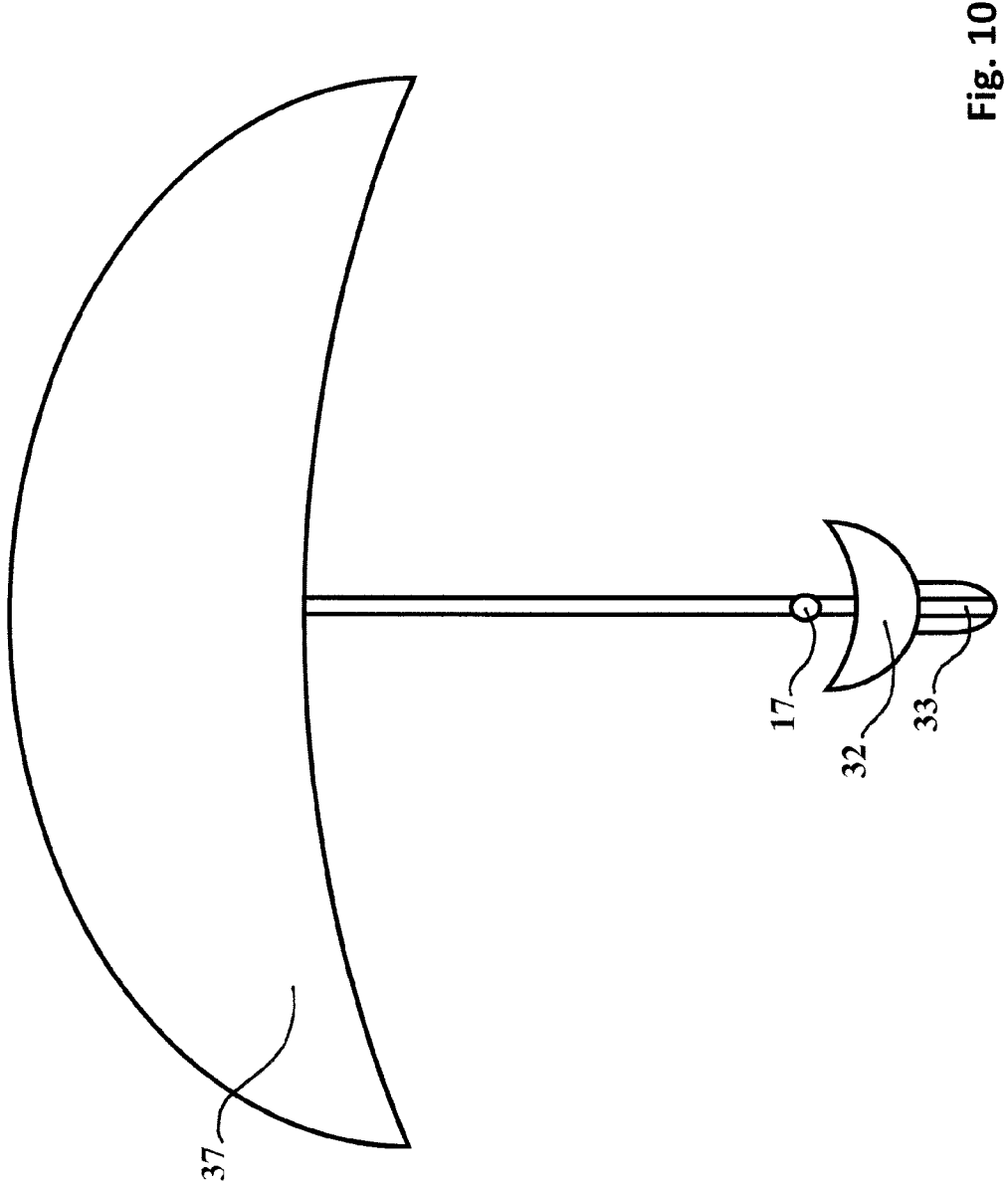

SHOPPING CART ATTACHMENT FRAME APPARATUS

CROSS-REFERENCE TO RELATED APPLICATIONS

This application is a non-provisional of U.S. Provisional Patent Application Ser. No. 61/717,868 filed on 24 Oct. 2012, which is hereby incorporated herein by reference.

Priority of U.S. Provisional Patent Application Ser. No. 61/717,868 filed on 24 Oct. 2012 is hereby claimed.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the field of baby strollers, more specifically, a baby stroller that has a frame incorporated in the aesthetic and structural design of the stroller that can connect said baby stroller to a shopping cart. More specifically, the present invention is in the field of baby strollers that can be simultaneously operated with shopping carts by a single user.

As a preliminary note, it should be stated that there is an ample amount of prior art that deals with baby strollers. As will be discussed immediately below, no prior art discloses a baby stroller wherein a frame can be engaged and attached to a shopping cart, and of which the top tray of the stroller is used as a means to attach and pivot said frame and attach an optional umbrella, and of which includes a means to pivot the frame to accommodate shopping carts of different sizes, and of which includes a means of attachment that can be opened or closed as the frame is engaged or disengaged simultaneously, and of which includes a means to articulate the handle of the frame for the users comfort, and of which includes a means to articulate the means of attachment for the users comfort to accommodate shopping carts of different sizes, and of which includes a means to attach an optional umbrella to cover the baby and the user that can be articulated, and of which includes a means to collect condensation dripping from said umbrella.

SUMMARY OF THE INVENTION

The baby stroller with the Shopping Cart Attachment Frame involves a frame that is incorporated into the aesthetic and structural design of the stroller and that can attach said stroller to a shopping cart. The frame can be pivoted by a connecting means to the stroller and adjusted to accommodate different size shopping carts. The frame can be pivoted or locked into position and the attachment means can be open or closed by a single operation from the user. The shopping cart attachment frame incorporates a top tray that replaces the baby stroller's conventional tray and can be used as a means to attach an umbrella equipped with container to collect condensation and that can be articulated.

It is an object of the invention to provide a baby stroller that can be attached to a shopping cart such that the stroller and the shopping cart can be easily operated simultaneously by a single user.

A further object of the invention is to provide a frame that is stable enough to allow the simultaneous use of a conventional stroller in conjunction with a conventional shopping cart.

A further object of the invention is to provide a frame release mechanism that allows the frame to pivot when engaged and locks the frame into position when disengaged.

A further object of the invention is to provide an attachment means that attaches the frame to said shopping cart.

A further object of the invention is to provide an attachment means that will have positive control of said shopping cart.

A further object of the invention is to provide an attachment release mechanism that opens the means of attachment when engaged and closes the means of attachment when disengaged.

A further object of the invention is to provide a release mechanism wherein the frame can be pivoted or locked into position and the attachment means can be open or closed by a single operation by the user.

A further object of the invention is to provide a handle where the release mechanism can be operated while said stroller is use.

A further object of the invention is to provide a handle that pivots the frame.

A further object of the invention is to provide a handle that can operate said baby stroller when the frame is not in use.

A further object of the invention is to provide a handle that can be articulated for the user's comfort when the frame is either engaged or disengaged.

A further object of the invention is to provide an umbrella that is an accessory that can protect the infant, or child, and the user from the elements.

A further object of the invention is to provide an umbrella that can be rotated and articulated to adjust for changing weather conditions.

A further object of the invention is to provide an umbrella with a container incorporated into the handle to collect condensation.

These together with additional objects, features and advantage of the Shopping Cart Attachment Frame will be readily apparent to those of ordinary skill in the art upon reading the following detailed description of presently preferred, but nonetheless illustrative, embodiments of the shopping cart attachment frame when taken in conjunction with the accompanying drawings.

In this respect, before explaining the current embodiments of the Shopping Cart Attachment Frame in detail, it is to be understood that the Shopping Cart Attachment Frame is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Shopping Cart Attachment Frame.

It is therefore important that the claims be regarded as including such equivalent construction insofar as they do not depart from the spirit and scope of the Shopping Cart Attachment Frame. It is also to be understood that the phraseology and terminology employed herein are for the purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

FIG. 10: is a side view of one version of the present invention; the Umbrella, the Joint, the Condensation Container, and the Umbrella Handle.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
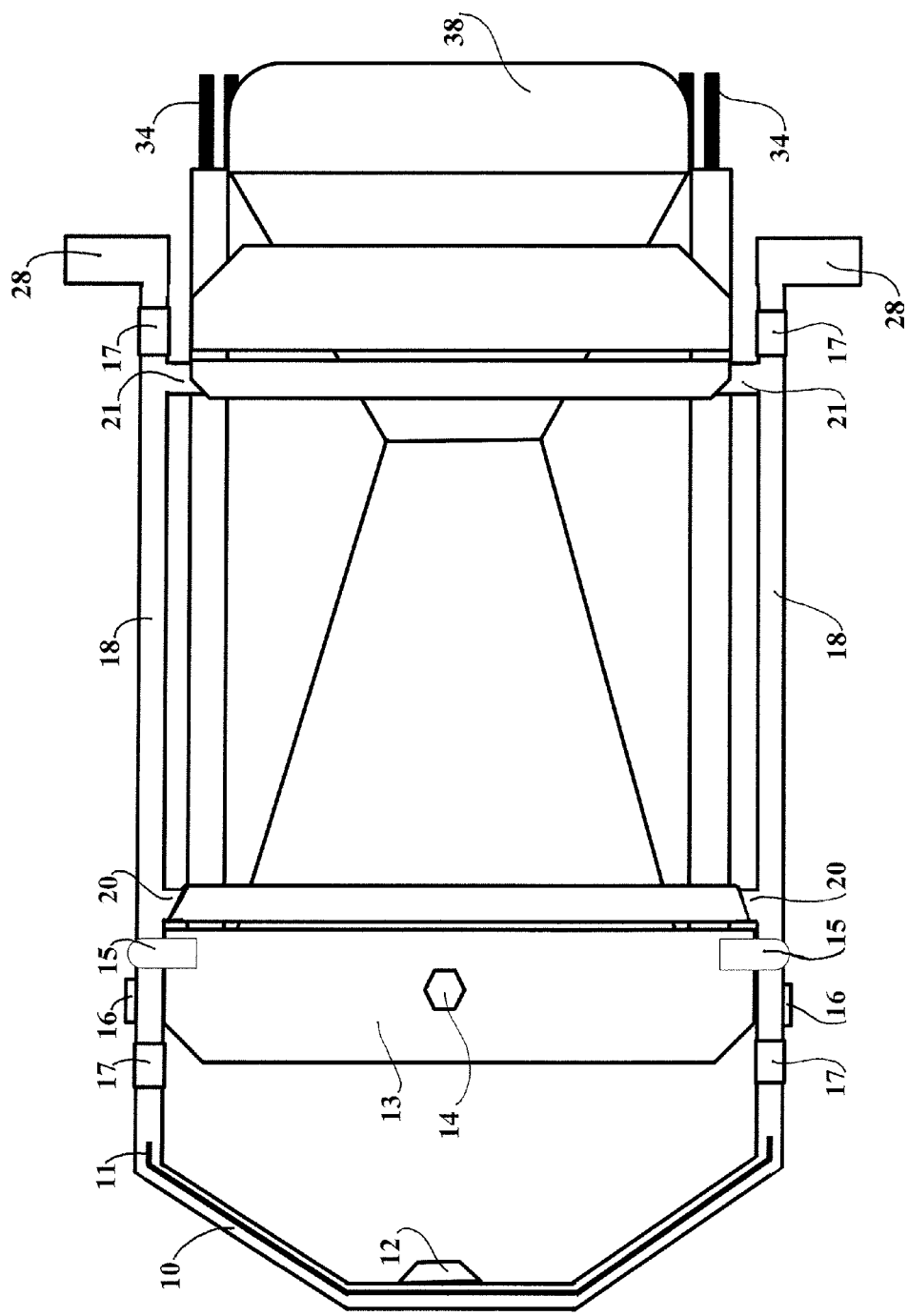
FIG. 1: is a top view of one version of the present invention; the Shopping Cart Attachment Frame as it could sit on a conventional stroller.

Referring now to the invention in more detail, in FIG. 1 there is shown The Shopping Cart Attachment Frame comprising of at least a Side Frame Member 18 with a Handle 10 on one end and an Attachment Gripper 28 on the other end. The Shopping Cart Attachment Frame is comprised of a Side Frame Member 18 that is relatively symmetrical and connected to the stroller by Axle 16 that is built into the Top Tray 13. The Side Frame Member 18 can pivot up or down on said Axle 16. The Axle 16 may also serve the purpose of turning the stroller's frame in line with the Side Frame Member 18. The Handle 10 and the Attachment Gripper 28 may be connected to the Side Frame Member 18 by a Joint 17 that can be articulated to accommodate shopping carts of different sizes. The Joints 17 may also be articulated for the user's comfort. The Top Tray 13 may replace the tray of conventional strollers and provides adequate function for the use of the transporting infants or children. The Top Tray 13 is attached to a conventional collapsible stroller's frame 38 allowing the Side Frame Members 18 to remain at or near the same height as the shopping cart when in operation. The Handle 10 and a Top Tray 13 may replace the handle and top tray of a conventional collapsible baby stroller integrating them into the stroller's design. The Handle 10 may have a Stroller Collapse Button 12 that actuates the folding action of the stroller and remains in the design of the Handle 10 as it would in any conventional collapsible stroller. The Shopping Cart Attachment Frame does not interfere with the normal operation of a collapsible stroller. The Top Frame Cross Member 20 may have a molded plastic tray end attached on top that mates to the front of the Top Tray 13 when in the Up position adding to the body and utility of the Top Tray 13. The Top Frame Cross Member 20 is up high enough on the Side Frame Member 18 as to not interfere nor be in the way of safely removing or placing a child in the stroller and serves to provide rigidity to the frame. The Bottom Frame Cross Member 21 may have a molded plastic tray end attached to the top that mates to the rear of the bottom tray of a conventional stroller when in the Down position adding to the body and utility of the bottom tray. The Bottom Frame Cross Member 21 and the stroller's bottom tray may have enough room between them so as to not create a pinching point during operation and serves to provide rigidity to the frame.

In more detail, still referring to FIG. 1, the Shopping Cart Attachment Frame is shown including an Umbrella Holder 14 and Frame Stoppers 15 incorporated into the Top Tray 13, a Release Bar 11 and Stroller Collapse Button 12 incorporated into the Handle 10.

In further detail, still referring to FIG. 1, The Side Frame Member 18 is sufficiently wide, tall and long enough for pushing a shopping cart such as about 10 to 36 inches wide and about 0.125 inches to 8 inches tall and about 10 to 60 inches long. The Attachment Grippers 28 are sufficiently wide, tall and long enough to connect to a shopping cart such as about 0.50 inches to 8 inches wide and about 0.50 inches to 8 inches tall and about 0.50 inches to 48 inches long. The Joint 17 is sufficiently wide, tall and long as about 0.125 inches to 8 inches wide; and about 0.125 inches to 8 inches tall and about 0.125 inches to 36 inches long and is rigid enough to connect the Handle 10 to the Side Frame Member 18 and connect the Side Frame Member 18 to the Attachment Grippers 28.

The construction details of the invention as shown in FIG. 1 are that the Shopping Cart Attachment Frame may be made out of wood, or of any other sufficiently, light, rigid and strong and non-conductive material such as high strength plastic or a composite, or metal and the like. Further, the various components of the Shopping Cart Attachment Frame 18 can be made of different materials.

Figure 2:
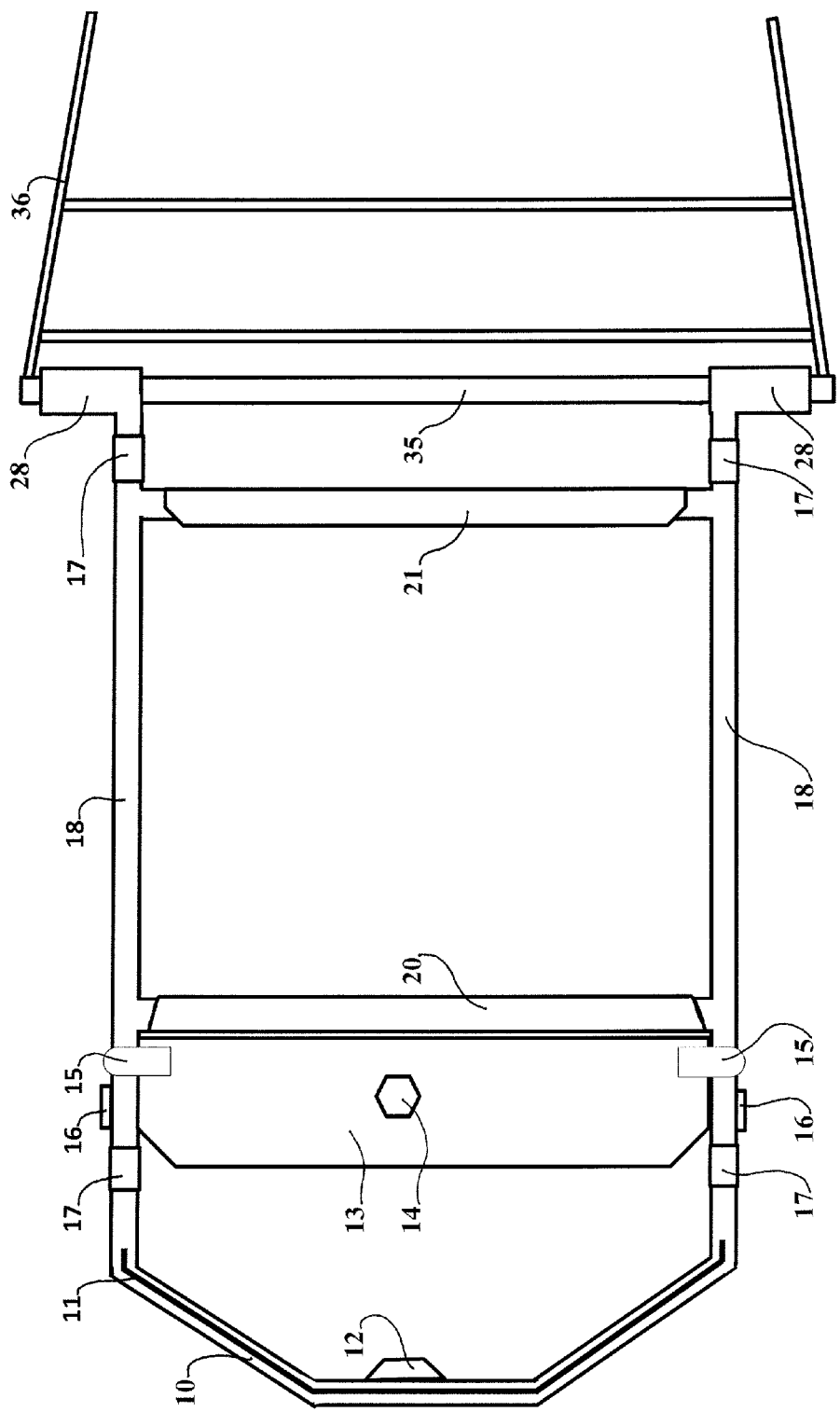
FIG. 2: is a top view of one version of the present invention; the Shopping Cart Attachment Frame attached to a conventional shopping cart handle.

Referring now to FIG. 2, there is shown a Shopping Cart Attachment Frame having the Attachment Grippers 28 connected to the handle of a conventional shopping cart 35.

In more detail, still referring to FIG. 2, the Shopping Cart Attachment Frame is shown without being connected to a conventional stroller.

In further detail, still referring to FIG. 2, The Umbrella Holder 14 has a substantially hexagonal profile which is of a sufficient diameter, for instance a diameter of 0.125 inches to 8 inches and about 0.125 inches to 8 inches deep and is rigid enough to support the optional Umbrella 37. The Top Frame Cross Member 20 has a substantially cylindrical profile and is sufficiently wide, tall and long as about 0.125 inches to 8 inches wide and about 0.125 inches to 8 inches tall and about 0.125 inches to 60 inches long and is rigid enough to provide stability to the Frame 18. The Bottom Frame Cross Member 21 has a substantially cylindrical profile and is sufficiently wide, tall and long as about 0.125 inches to 8 inches wide and about 0.125 inches to 8 inches tall and about 0.125 inches to 60 inches long and is rigid enough to provide stability to the Frame 18.

Figure 3:
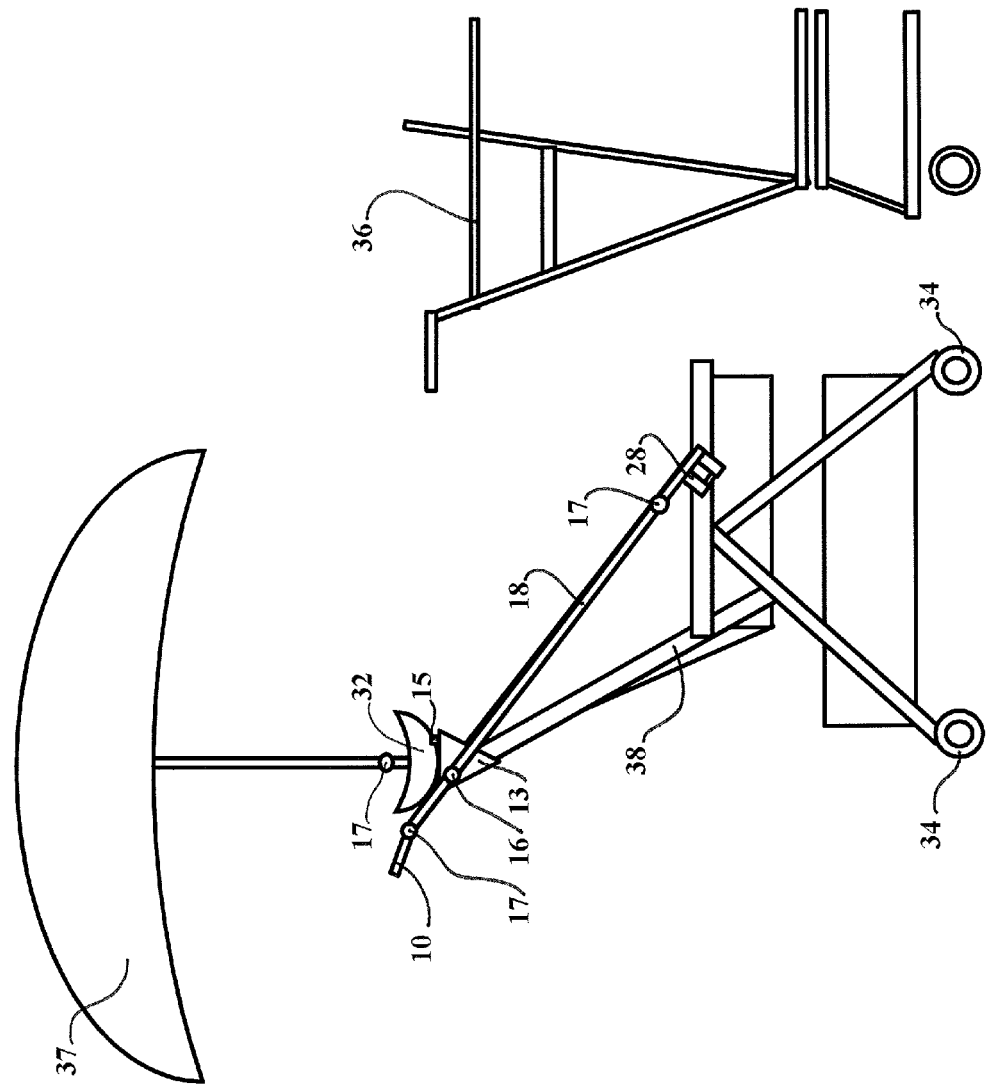
FIG. 3: is a side view of one version of the present invention; the Shopping Cart Attachment Frame on a conventional stroller with the umbrella inserted to the Top Tray and behind a conventional shopping cart. The figure demonstrates how the Handle and the Attachment Grippers can be adjusted at the Joints.

Referring now to FIG. 3, there is shown the Shopping Cart Attachment Frame incorporated into the design of a conventional stroller, placed behind a conventional shopping cart 36, with the optional Umbrella 37 attached to the Top Tray 13, with the Handle 10 and the Attachment Grippers 28 articulated at the Joints 17, to accommodate the user.

In more detail, still referring to FIG. 3, the optional Umbrella 37 is shown including the Condensation Container 32 incorporated into the handle of the Umbrella 37 and a Joint 17 incorporated into the stem of the Umbrella 37 and a conventional stroller 38 with Swivel Wheels 34 and the Frame Stopper and the Axle incorporated on the Top Tray.

In further detail, still referring to FIG. 3, the Condensation Container 32 has a substantially circular profile which is of a sufficient diameter, for instance a diameter of about 4 inches to 20 inches. The Umbrella 37 has a substantially circular profile which is of a sufficient diameter, for instance a diameter of about 10 to 56 inches. The Umbrella Handle 33 has a substantially hexagonal profile which is of sufficient diameter, for instance a diameter of about 0.50 inches to 8 inches and is sturdy enough to hold the umbrella. The conventional stroller 38 could be equipped with multi-directional swivel wheels.

Figure 4:
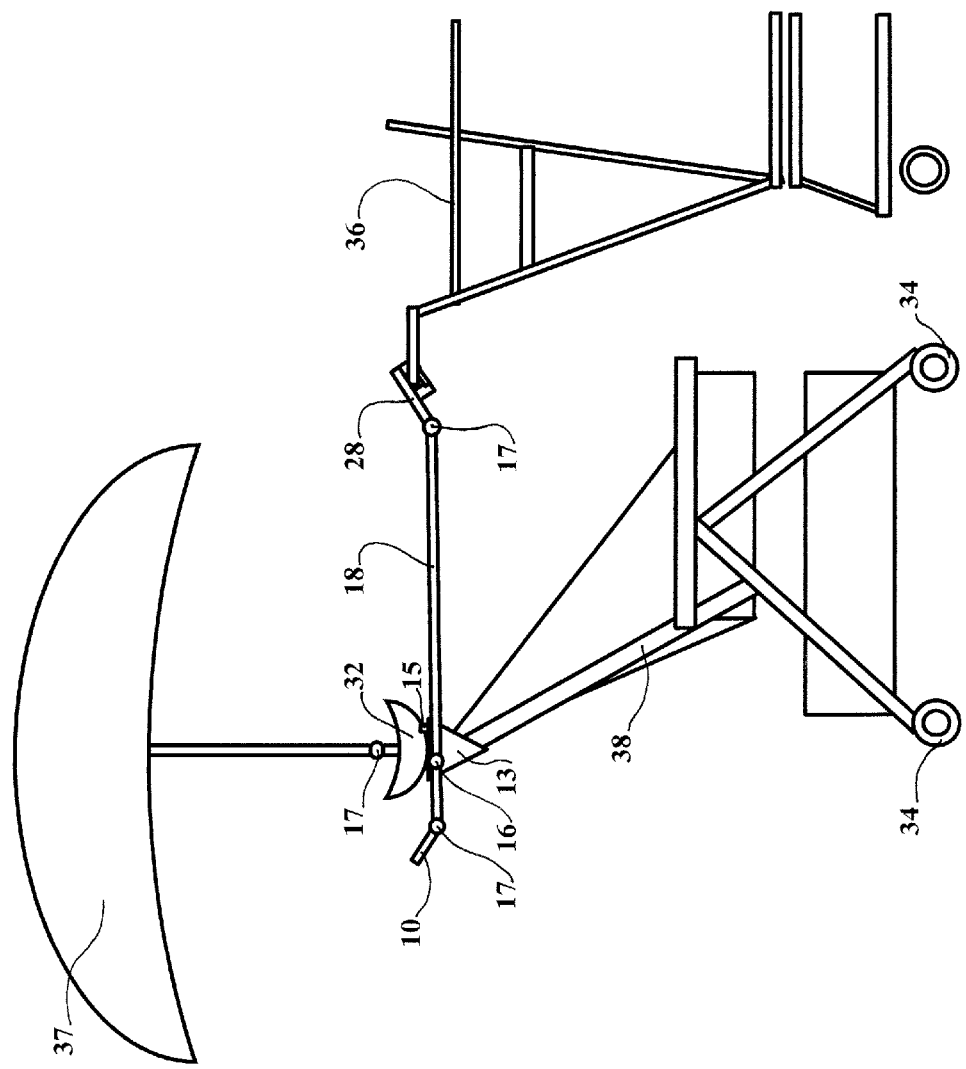
FIG. 4: is a side view of one version of the present invention; the Shopping Cart Attachment Frame on a conventional stroller with the umbrella inserted to the Top Tray and attached to a conventional shopping cart. The figure demonstrates how the Handle and the Attachment Grippers can be adjusted at the Joints.

Referring now to FIG. 4, there is shown a Shopping Cart Attachment Frame incorporated into the design of a conventional stroller, attached to the handle of a conventional shopping cart 36, with the optional Umbrella 37 attached to the Top Tray 13, with the Handle 10 and the Attachment Grippers 28 articulated at the Joints 17, to accommodate the user and the different sized shopping cart.

Figure 5:
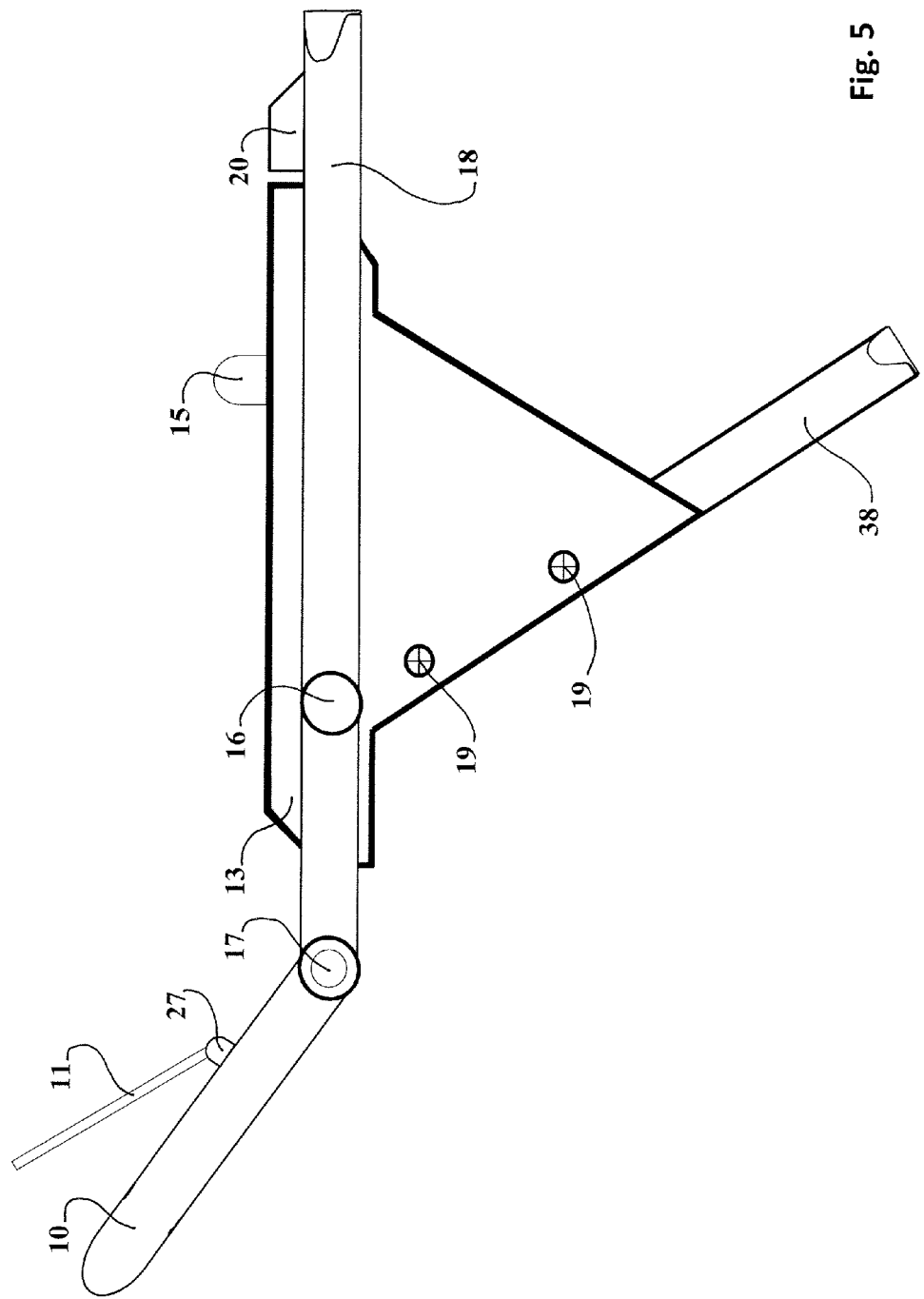
FIG. 5: is a side view of one version of the present invention; the Handle, the Release Bar, the Cable Linkage, the Joint, the Axle, the Top Tray, the Frame Stopper, the Fastener, part of the stroller frame, the Top Frame Cross Member and part of the Side Frame Member as it could be attached to a conventional stroller. The figure shows the Shopping Cart Attachment Frame in the UP position.

Referring now to FIG. 5, there is shown the Release Bar 11 connected to the Handle 10 by the Cable Linkage 27. The Handle 10 is connected to the Side Frame Member 18 by the Joint 17. The Side Frame Member 18 is connected to the Top Tray 13 by the Axle 16. The Top Tray 13 is connected to the Baby Stroller 38 by the Fasteners 19.

In more detail, still referring to FIG. 5, the Side Frame Member 18 as shown includes the Top Frame Cross Member 20 and the Frame Stopper 15 connected to the upper portion of the Top Tray 13.

In further detail, still referring to FIG. 5, the Top Tray 13 has a substantially horizontal top surface and is sufficiently wide, tall, and long enough to support the Shopping Cart Attachment Frame as about 1 inch to 18 inches wide and about 1 inch to 18 inches tall and about 2 inches to 48 inches long. The Axle 16 has a substantially cylindrical profile and is sufficiently wide, tall and long as about 0.125 inches to 8 inches wide and about 0.125 inches to 8 inches tall and about 0.125 inches to 48 inches long and rigid enough to support the Shopping Cart Attachment Frame. The Fastener 19 can have any substantial characteristic in conformance to other fasteners that are sufficiently strong enough to hold the Top Tray 13 to said stroller 38. The Frame Stopper 15 has a substantially cylindrical profile as is sufficiently wide, tall, and long as about 0.125 inches to 8 inches wide and about 0.125 inches to 8 inches tall and about 0.125 to 48 inches long and is rigid enough to prevent the Side Frame Member 18 from any further upward movement. The Frame Stopper 15 can be located on any portion of the Top Tray 13.

The construction details of the invention as shown in FIG. 5 are that the Top Tray 13, the Axle 16 and the Fastener 19 may be made out of wood, or of any other sufficiently, light, rigid and strong and non-conductive material such as high strength plastic or a composite, or metal and the like. Further, the various components of the Top Tray 13 and Axle 16 can be made of different materials.

Figure 6:
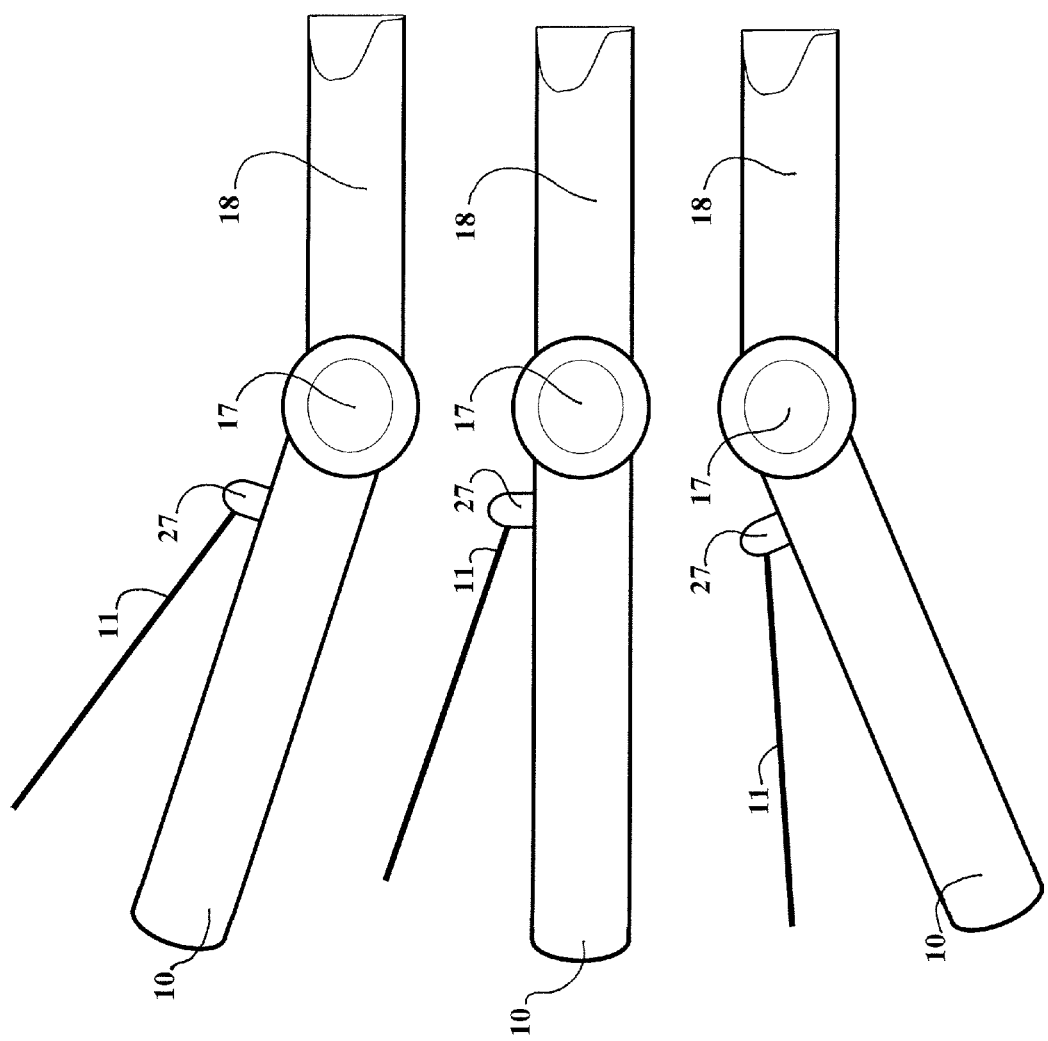
FIG. 6: is a side view of one version of the present invention; the Handle, the Release Bar, the Cable Linkage, the Joint and part of the Side Frame Member. This figure shows the handle in different positions.

Referring now to FIG. 6, there is shown the Handle 10, the Release Bar 11, the Cable Linkage 27, the Joint 17, and part of the Side Frame Member 18. The Handle 10 is connected to the Side Frame Member 18 by the Joint 17. The Release Bar 11 is attached to the Handle 10 by means of the Cable Linkage 27.

In more detail, still referring to FIG. 6, there is shown the Handle 10 in different positions in relation to the horizontal Side Frame Member 18.

In further detail, still referring to FIG. 6, Handle 10 has a substantially cylindrical profile which is of a sufficient diameter, for instance of a diameter of about 0.125 inches to 8 inches and is sturdy enough to operate the stroller and shopping cart simultaneously. The Side Frame Member 18 has a substantially cylindrical profile which is of a sufficient diameter, for instance a diameter of about 0.125 inches to 8 inches and is sturdy enough to move a shopping cart. The Release Bar 11 has a substantially cylindrical profile which is of a sufficient diameter, for instance a diameter of about 0.125 inches to 8 inches and is sturdy enough to operate the Locking Pins 22 and the Attachment Grippers 28 simultaneously.

The construction details of the invention as shown in FIG. 6 are that the Handle 10, the Release Bar 11, Cable Linkage 27, the Joint 17 and the Side Frame Member 18 may be made out of wood, or of any other sufficiently, light, rigid and strong and non-conductive material such as high strength plastic or a composite, or metal and the like. Further, the various components of the Handle 10 can be made of different materials.

Figure 7:
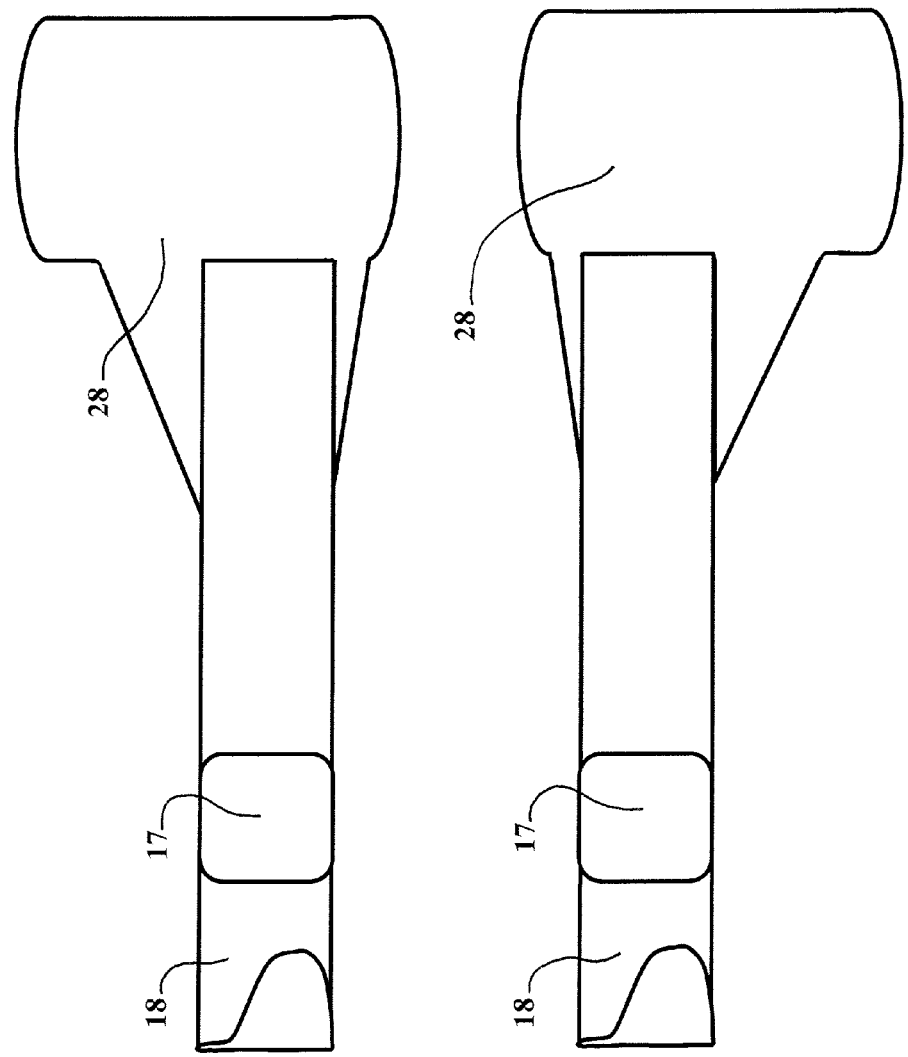
FIG. 7: is a top view of one version of the present invention; the Attachment Grippers, the Joint, and part of the Side Frame Member. The top illustration shows how one Attachment Gripper can be on the left and the bottom illustration shows how one Attachment Gripper can be on the right.

Referring now to FIG. 7, there is shown the Attachment Grippers 28 connected to the Joint 17 which is connected to the Side Frame Member 18.

In more detail, referring to FIG. 7, the top illustration shows the left Attachment Gripper 28 and the bottom illustration shows the right Attachment Gripper 28.

In further detail, still referring to FIG. 7, the Attachment Gripper 28 has a substantially elongated profile and is sufficiently wide, tall and long as about 0.50 inches wide to 8 inches wide and about 0.50 inches to 8 inches tall and about 0.50 inches to 48 inches long and rigid enough to push a conventional shopping cart.

The construction details of the invention as shown in FIG. 7 are that the Attachment Grippers 28 may be made out of wood, or of any other sufficiently, light, rigid and strong and non-conductive material such as high strength plastic or a composite, or metal and the like. Further, the various components of the Attachment Grippers 28 can be made of different materials.

Figure 8:
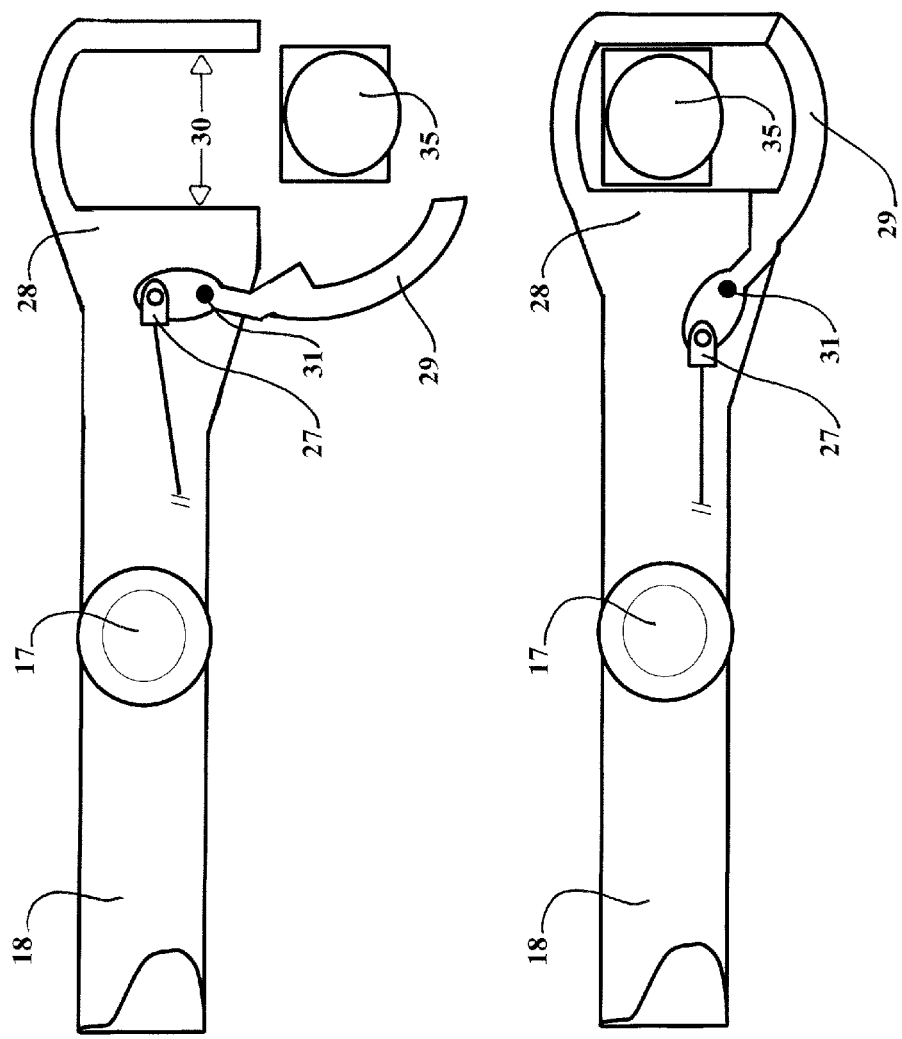
FIG. 8: is a side view and cross view of one version of the present invention; the inner parts of the Attachment Gripper with a cross view of a conventional shopping cart handle. The figure shows how the Push/Pull Cable is attached to the Gripper Door by the Cable Linkage. The top illustration shows the Attachment Gripper in the open position as the Release Bar is operated. The bottom illustration shows the Attachment Gripper in the closed position as the Release Bar is not in operation.

Now referring to FIG. 8, there is shown the Attachment Grippers 28, the Cable Linkage 27, the Gripper Door 29, the Gripper Throat 30, the Pin 31, and the Shopping Cart Handle 35, the Joint 17 and part of the Side Frame Member 18.

In more detail, still referring to FIG. 8, the Attachment Gripper 28 is shown in both the open and closed positions. The top illustration shows the Gripper Door 29 in the open position where by the Shopping Cart Handle 35 enters the Gripper Throat 30. The bottom illustration shows the Gripper Door 29 in the closed position where by the Shopping Cart Handle 35 is retained by the Attachment Gripper 28.

In further detail, still referring to FIG. 8, the Gripper Throat 30 has a substantially open profile and is sufficiently wide, tall and long to effectively attach to a conventional shopping cart handle 35 as about 0.125 inches to 8 inches wide and about 0.125 to 8 inches tall and about 0.125 inches to 48 inches long. The Gripper Door 29 has a substantially elongated profile and is sufficiently wide, tall and long to effectively retain the shopping cart handle 35 as about 0.125 inches to 8 inches wide and about 0.125 to 8 inches tall and about 0.125 inches to 48 inches long. The Pin 31 has a substantially cylindrical profile and is sufficiently wide, tall and long enough to allow the Gripper Door 29 to pivot as about 0.125 inches to 8 inches wide and about 0.125 to 8 inches tall and about 0.125 inches to 48 inches long. The Cable Linkage 27 has a substantially cylindrical profile and is sufficiently wide, tall, long, and rigid enough to effectively operated the Locking Pin 22 and the Gripper Door 29 as about 0.005 inches to 2 inches wide and about 0.005 inches to 4 inches tall and about 10 inches to 60 inches long. The Push/Pull Cable 26 has a substantially cylindrical profile and wide, tall and long as about 0.005 inches to 8 inches wide and about 0.005 inches to 8 inches tall and about 0.005 inches to 80 inches long and rigid enough to simultaneously operate the Locking Pins 22 and the Gripper Door 29.

Figure 9:
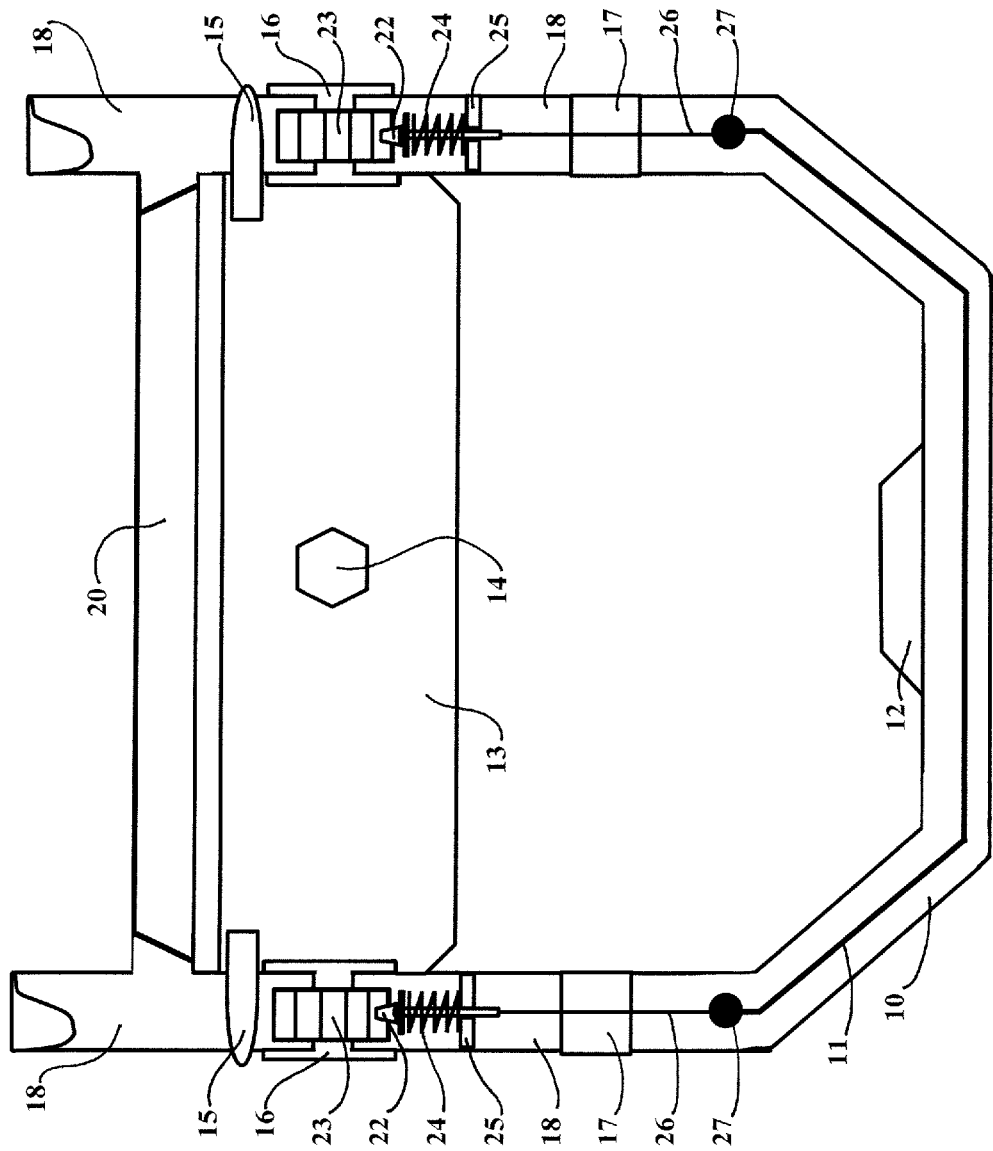
FIG. 9: is a top view and cross view of one version of the present invention; the inner parts of the Handle, Release Bar, the Cable Linkage, the Push/Pull Cable, the Locking Pin, the Locking Pin Holder, the Spring, the Spring Holder, the Axle, the Frame Stoppers, the Top Tray, the Umbrella Holder, the Joint, the Top Frame Cross Member, and part of the Side Frame Member.

Now referring to FIG. 9, there is shown the Handle 10, the Release Bar 11, the Stroller Collapse Button 12, the Cable Linkage 27, the Push/Pull Cable 26, The Joint 17, the Locking Pin Holder 23, the Spring 24, the Spring Holder 25, the Locking Pin 22, and the Axle 16, the Top Tray 13, the Umbrella Holder 14, Frame Stoppers 15, and part of the Side Frame Members 18.

In more detail, still referring to FIG. 9, the Locking Pin Holder 23 is shown as one unit with the Axle 16. The Push/Pull Cable 26 is connected to the Locking Pin 22 by conventional means.

In further detail, still referring to FIG. 9, the Locking Pin 22 has a substantially cylindrical profile and is of sufficient diameter and length as about 0.005 inches to 8 inches in diameter and about 0.125 inches to 8 inches long and is rigid enough to lock into place. The Locking Pin Holder 23 has a substantially round profile and is of sufficient diameter and width as about 0.125 inches to 8 inches in diameter and about 0.50 inches to 8 inches wide and rigid enough to keep the Locking Pin 22 in place. The Spring 24 has a substantially helical profile and is of a sufficient diameter, length and resistance as about 0.005 inches to 8 inches in diameter and about 0.125 inches to 8 inches long and may have about 0.125 lbs. to 50 lbs. of resistance. The Spring Holder 25 has a substantially round profile and is of sufficient diameter, thickness and with an opening as about 0.005 inches to 8 inches in diameter and about 0.005 inches to 8 inches thick with an opening of about 0.005 inches to 8 inches in diameter.

Now referring to FIG. 10, there is shown the Umbrella 37 in the open position, the Joint 17, the Condensation Container 32 and the Umbrella Handle 33.

The advantages of the present invention include, without limitation, the Shopping Cart Attachment Frame allows the user to push a conventional baby stroller and shopping cart as one unit. The Shopping Cart Attachment Frame makes the simultaneous use of an occupied baby stroller and a loaded shopping cart easier for a single user. This is a beneficial advantage to parents in discount shopping centers where large shopping carts are used.

Shopping centers do offer shopping carts with plastic seat attachments for children to ride in while the parents are shopping. There are few of these modified shopping carts to choose from and availability differs from store to store. The attachments are made of a hard molded plastic and are exposed to the environment and animals along with the other dirty shopping carts. Parents are often left to wonder how many leaky diapers or contagious children have been placed on these shopping carts. The customer's complaints about cross contamination have prompted stores to offer disinfectant wipes for the customer's safety.

The physical safety of children is also a factor when they are placed in shopping carts, as this has been determined to be a dangerous practice by the American Academy of Pediatrics. The American Academy of Pediatrics has created a policy against children riding in shopping carts or the placing of the baby carriers on the shopping carts based on the report titled "Shopping Cart-Related Injuries to children" published in the August 2006 issue of Pediatrics. Citing approximately 23,000 injuries each year to children from shopping carts.

http://aappolicy.aappublications.org/cgi/content/full/pediatrics;118/2/e545

As an alternative, the AAP recommends getting another adult to watch the child while shopping; placing the child in a stroller, wagon or front pack instead of in a shopping cart; asking the child to walk on their own; leaving the at home with another adult; shopping online if at all possible.

If the parent is going to place the child in the shopping cart anyway, the AAP recommends placing the child in a safety belt or harness at all times; never leaving the child alone; not letting the child stand up in the shopping cart; not placing the child carrier on top of the shopping cart; not placing the child in the basket; never allowing the child to ride on the outside of the shopping cart; never allowing a child to climb on the shopping cart; never allowing a child to push the shopping cart with another child in it.

The user may resort to placing a cover with a safety belt over the shopping cart as an alternative since most shopping carts do not have safety belts. This poses an inconvenience as the child will not be able to fall asleep in the cart cover and will still be exposed to the dangers of riding in a shopping cart.

With the Shopping Cart Attachment Frame, the user will no longer have to choose between using the unsafe and often dirty shopping carts or their strollers to transport their children while shopping. Or have to resort to pushing their occupied stroller while pulling the loaded shopping cart in an effort to keep their children safe and comfortable. Or require that a second adult watch the child while the parent shops. Moreover, balancing the use of the stroller and a shopping cart is a fear that new mothers face every time they go shopping.

Advantages of using the Shopping Cart Attachment Frame with the optional Umbrella with the Condensation Container:

1. The user will not have to place their child in the unsafe shopping cart.
2. The user will be able to attach the stroller to the shopping cart without having to remove the child from inside the stroller.
3. The user will be able to attach the stroller to the shopping cart without having to release their control of said stroller.
4. A single user will be able to push their occupied stroller and a loaded shopping cart simultaneously while maintaining positive control of both.
5. The user will no longer have to shuffle back and forth between placing and removing the child and groceries from the shopping cart.
6. The user will be able to keep their children safely secured to their own stroller during the entire interaction with the shopping cart.
7. The user will be able to keep their children comfortable in their own stroller while shopping.
8. The user's children will not be exposed to the dirty shopping carts.
9. The user will not have to place their cart covers on the dirty or wet shopping carts while holding their children.
10. The user will be better protected from inclement weather while pushing a stroller with their children and a loaded shopping cart with the Shopping Cart Attachment Frame and the optional Umbrella.
11. The user will be able to keep the optional Umbrella attached to the Shopping Cart Attachment Frame once inside the store and prevent creating a slipping hazard by collecting the dripping rain in the Condensation Container.
12. The User will have their optional Umbrella ready to be used while it is attached to the Shopping Cart Attachment Frame.

Other Uses:

Variations of the Shopping Cart Attachment Frame concept can include attaching the stroller to the front of the shopping cart with a flip down stroller handle/bar frame. A stroller equipped with the Shopping Cart Attachment Frame could also be attached to the flat bed dollies used to move large quantities of merchandize in discount stores or hardware stores.

Note:

The Shopping Cart Attachment Frame can also be designed to be an add-on to existing strollers. This may influence the design of other baby strollers to include a manner to easily attach the add-on Shopping Cart Attachment Frame. The conventional stroller will require having swivel wheels on all four legs in order to be most effective in steering a conventional shopping cart with the Shopping Cart Attachment Frame.

Note:

This concept may change the future design of collapsible strollers and strollers for multiple children to include a manner to connect directly to shopping carts. It may also influence future design of shopping carts that facilitate the attachment of baby strollers to their handle or other structural members of the shopping cart.

In broad embodiment, the present invention is a frame connected to the stroller by at least one rotating member and connected to a shopping cart by at least one attaching member.

DESCRIPTION

The Shopping Cart Attachment Frame is utilized mainly on conventional baby strollers to facilitate the simultaneous use of the baby stroller with a shopping cart.

Section 1:

The steps include, are not limited to the following; the conventional stroller equipped with the Shopping Cart Attachment Frame is brought to the rear of the conventional shopping cart near its handle FIG. 3. The Release Bar 11 on the Handle 10 is operated releasing the Locking Pins 22 from the Locking Pin Holder 23 allowing the Shopping Cart Attachment Frame to pivot on the Axles 16 and opening the Attachment Grippers 28 simultaneously FIG. 8 & FIG. 9. The Shopping Cart Attachment Frame is pivoted so that the Attachment Grippers 28 are brought over the shopping cart handle 35. The Shopping Cart Attachment Frame is lowered so that the shopping cart handle 35 enters the Gripper's Throat 30 FIG. 8. The Frame Stoppers 15 which are located on the forward side and on top of the Top Tray 13 prevent the Side Frame Member 18 from being over rotated while unlocked preventing the user from losing control of the stroller.

Once the shopping cart's handle 35 is inside the Attachment Grippers 28, the Release Bar 11 is released closing the Gripper Doors 29 and locking the Shopping Cart Attachment Frame in place. The Attachment Grippers 28 retain a positive hold on the shopping cart handle 35, as shown in FIG. 8 & FIG. 4. The Handle 10 and the Attachment Grippers 28 can be articulated for the user's comfort by operating the Joints 17 and securing them in a comfortable position, as shown in FIG. 4.

The Umbrella 37 can be attached to the Top Tray 13 while the Shopping Cart Attachment Frame is in the up or down position, as shown in FIG. 3 & FIG. 4. This is accomplished by inserting the Umbrella Handle 33, located at the bottom of the Umbrella's Condensation Container 32, into the Umbrella Holder 14, located on the Top Tray 13. The angle of the Umbrella 37 can be articulated in different positions by operating the Joint 17 FIG. 10. This allows the Umbrella to be used in conjunction with the Shopping Cart Attachment Frame while attached to a shopping cart, as shown in FIG. 4.

The Shopping Cart Attachment Frame can be disconnected from the shopping cart handle 35 by operating the Release Bar 11. This operation unlocks the Shopping Cart Attachment Frame allowing it to pivot on the Axles 16 and opens the Gripper Doors 29, simultaneously, allowing the shopping cart handle to exit the Gripper Throat 30. Once the shopping cart handle 35 is out of the Gripper Throat 30 the Shopping Cart Attachment Frame can be lowered back to the down position and secured to the conventional stroller frame by releasing the Release Bar 11. The Handle 10 can then be adjusted for the user's comfort by operating the Joint 17, as shown in FIG. 6.

Section 2.

The Shopping Cart Attachment Frame FIG. 1 includes a Handle Bar 10 and Top Tray 13 that may replace the handle bar and top tray on a conventional collapsible baby stroller and may be integrated into the stroller's design. The button 12 that actuates the folding action of the stroller remains in the design of the Handle 10 of the Shopping Cart Attachment Frame. The Shopping Cart Attachment Frame can function properly on collapsible and non-collapsible strollers.

The Shopping Cart Attachment Frame is a single unit comprised of at least one Side Frame Member 18 that pivots on Axle 16 that is built in the Top Tray 13. The Top Tray 13 is attached to a conventional stroller's frame 38. The Top Frame Cross Member 20 may have a molded plastic tray end attached on top that mates to the front of the Top Tray 13 when in the Up position adding to the body and utility of the Top Tray 13. The Top Frame Cross Member 20 is up high enough on the Side Frame Member 18 to not interfere nor be in the way of safely placing a child in the stroller. The Bottom Frame Cross Member 21 may have a molded plastic tray end attached to the top that mates to the rear of the bottom tray of a conventional stroller when in the Down position adding to the body and utility of the bottom tray. The Bottom Frame Cross Member 21 and the stroller's bottom tray may have enough room between them so as to not create a pinching point.

The Side Frame Member 18 has an Attachment Gripper 28 FIG. 7 & FIG. 8 opposite the Handle Bar 10 that attaches the Shopping Cart Attachment Frame to the handle bar of a conventional shopping cart 36. The Attachment Gripper 28 and the Handle 10 can be articulated by operating the Joints 17 to accommodate shopping carts of different heights. When the Release Bar 11 is operated, it simultaneously pulls the Locking Pin 22 out of the Locking Pin Holder 23 allowing the Shopping Cart Attachment Frame to pivot up or down on the Axle 16 FIG. 9 and opens the Gripper Door 29 FIG. 8. This function allows the Shopping Cart Attachment Frame to pivot and the Attachment Gripper to open in one operation while maintaining control of the stroller and while the child remains secured in the stroller.

Scenario: Rainy or Snowy Day.

From inside the vehicle, the owner will be able to use the Umbrella to retrieve the conventional stroller equipped with the Shopping Cart Attachment Frame from the back of the vehicle during inclement weather. Once the stroller is unfolded and ready for use; the Umbrella is attached to the stroller and is articulated to best protect the user and the children while outside of the vehicle. The children are secured inside the stroller while the Umbrella keeps the children and the user protected from the weather. On the way in, or inside the store, the owner can then utilize the Shopping Cart Attachment Frame equipped stroller to connect to a shopping cart without removing the children from the stroller or even touching the wet shopping cart. The Umbrella can be closed, once inside the store, and left attached to the Shopping Cart Attachment Frame while the Condensation Receptacle collects the dripping water from the Umbrella.

The user will be able to push the stroller and shopping cart as one unit while shopping and place the items to be purchased inside the shopping cart. Allowing the user to monitor their children in the stroller and push a loaded shopping cart.

Outside, the Umbrella attached to the Shopping Cart Attachment Frame will keep the children and the user protected from the inclement weather while the user loads the purchased items into the vehicle. The children are then placed inside the vehicle without having to rush them inside. The Stroller is disconnected from the shopping cart, the Umbrella is disconnected from the Shopping Cart Attachment Frame, and both the Stroller and Umbrella can be stowed in the vehicle.

PARTS LIST

10. Handle Bar:
11. Release bar
12. Stroller Collapse Button
13. Top Tray
14. Umbrella Holder
15. Frame Stopper
16. Axle
17. Joint
18. Side Frame Member
19. Fastener
20. Top Frame Cross Member
21. Bottom Frame Cross Member
22. Locking Pin
23. Locking Pin Holder
24. Spring
25. Spring Holder
26. Push/Pull Cable
27. Cable Linkage
28. Attachment Gripper
29. Gripper Door
30. Gripper Throat
31. Pin
32. Condensation Container
33. Umbrella Handle
34. Swivel Wheel
35. Shopping Cart Handle (Prior Art)
36. Shopping Cart (Prior Art)
37. Umbrella (Prior Art 7,493,908 B2)
38. Stroller (Prior Art 2005/0242549)

Ranges:

10. Handle: is height Adjustable that can have a cover for a more comfortable grip or aesthetics; may be one or more handles or a combination thereof; may be a cylindrical in shape or any other geometric shape that gives it rigidity for its intended purpose; can be a solid or hollow member; can be comprised of a single bar or handle, multiple bars or handles or a combination thereof; Further, the various components of the Handle can be made of different materials.

Sizes: May have a preferred diameter of about 0.125 inches to 8 inches; or a more preferred diameter of about 0.50 inches to 6 inches or the most preferred diameter of about 1 inches to 3 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

11. Release Bar: Height Adjustable that can have a cover for a more comfortable grip or aesthetics and may be a cylindrical in shape or any other geometric shape that gives it rigidity for its intended purpose; can be a solid or hollow member; can be comprised of a single bar or handle, multiple bars or handles or a combination thereof; Can be positioned in any configuration on the Handle or on the stroller itself; Further, the various components of the Release Bar can be made of different materials.

Sizes: May have a preferred diameter of about 0.005 inches to 8 inches; or a more preferred diameter of about 0.125 inches to 6 inches; or the most preferred diameter of about 0.50 inches to 2 inches May have a preferred length of about 2 inches to 60 inches; or a more preferred length of 6 inches to 36 inches or the most preferred length of 8 inches to 24 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

12. Stroller Collapse Button: Does not interfere with the operation of the Shopping Cart Attachment Frame. The stroller collapse button is not necessary for the Shopping Cart Attachment Frame to function properly. Its serves the same function as it would on a conventional collapsible stroller.

13. Top Tray: has a substantially rectangular profile with a horizontal top surface and serves the purpose of connecting the existing stroller to the Axle and the Axle to the Frame; provides the stroller enough rigidity to be operated simultaneously with a shopping cart. It is of sufficient rigidity to support t the Shopping Cart Attachment Frame.

Sizes: May have a preferred width of about 0.50 inches to 36 inches; a more preferred width of about 2 inches to 24 inches; or the most preferred width of about 6 inches to 12 inches. May have a preferred height of about 0.50 inches to 36 inches; a more preferred height of about 2 inches to 24 inches; or the most preferred height of about 6 inches to 12 inches. May have a preferred length of about 0.50 inches to 48 inches; a more preferred length of about 2 inches to 36 inches; or the most preferred length of about 6 inches to 26 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

14. Umbrella Holder: has a substantially hexagonal profile or of any geometric shape that is stable enough to hold an umbrella for long periods of time. Can be incorporated anywhere into the stroller's design that would allow the best usage for the user preferably the Top Tray.

Sizes: May have a preferred diameter of about 8 inches; or a more preferred outside diameter of about 6 inches; or the most preferred outside diameter of about 2 inches. May have a preferred depth of about 8 inches; or a more preferred depth of about 6 inches; or the most preferred depth of about 4 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

15. Frame Stopper: has a substantially cylindrical profile and serves the purpose of stopping the Shopping Cart Attachment Frame from over rotating and causing the user to possibly lose control of the stroller. Can be incorporated anywhere into the design of the stroller's design that would help it serve the same purpose.

Sizes: May have a preferred width of about 0.005 inches to 24 inches; or a more preferred width of about 0.50 inches to 8 inches; the most preferred width of about 1 inch to 2 inches. May have a preferred height of about 0.005 inches to 24 inches; or a more preferred height of about 0.50 inches to 8 inches; the most preferred height of about 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

16. Axle: has a substantially cylindrical profile that serves the purpose of providing the Frame a pivot point and to keep the stroller in line with the frame. May also provide a mating surface to the Locking Pin. And is rigid enough to support the Shopping Cart Attachment Frame. May be integrated into the design of the stroller's frame.

Sizes: May have a preferred diameter of about 0.005 inches to 8 inches; or a more preferred diameter of about 0.125 inches to 4 inches; or the most preferred diameter of about 0.750 inches to 2 inches. May have a preferred length of about 0.005 inches to 48 inches long; or a more preferred length of about 0.50 inches to 24 inches long; or the most preferred length of about 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

17. Joint: has a substantially cylindrical profile and serves the purpose of connecting the different components of the Shopping Cart Attachment Frame and permits the different members to be in different angles in relation to each other. May also lock into the different positions the user may require.

Sizes: May have a preferred diameter of about 0.005 inches to 8 inches; or a more preferred diameter of about 0.125 inches to 4 inches; or the most preferred diameter of about 0.750 inches to 2 inches. May have a preferred length of about 0.005 inches to 8 inches long; or a more preferred length of about 0.50 inches to 4 inches long; or the most preferred length of about 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

18. Side Frame Member: has as substantially cylindrical profile and serves the purpose of connecting the Handle to the Attachment Grippers. May have any geometrical shape that gives the Frame enough rigidity to operate the stroller and the shopping cart simultaneously.

Sizes: May have a preferred diameter of about 0.005 inches to 8 inches; or a more preferred diameter of about 0.125 inches to 6 inches or the most preferred diameter of about 0.50 inches to 2 inches. May have a preferred length of about 2 inches to 60 inches; or a more preferred length of 6 inches to 48 inches or the most preferred length of 12 inches to 36 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

19. Fastener: May be any fastening means with substantial characteristics in conformance to other fasteners that are sufficiently strong enough to hold the Top Tray to a conventional Stroller. May have one or more fastener or a combination thereof.

Size: The fastener may be of any conventional size sufficiently strong enough to serve its purpose.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

20. Top Frame Cross Member: has a substantially cylindrical profile and serves the purpose of connecting the Side Frame Members. May have any geometrical shape that gives the Frame enough rigidity to operate the stroller and the shopping cart simultaneously. A section of the Top Tray can be attached to the top of the Top Frame Cross member.

Sizes: May have a preferred diameter of about 0.005 inches to 8 inches; or a more preferred diameter of about 0.125 inches to 6 inches or the most preferred diameter of about 0.50 inches to 2 inches. May have a preferred length of about 2 inches to 60 inches; or a more preferred length of 6 inches to 48 inches or the most preferred length of 12 inches to 36 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

21. Bottom Frame Cross Member: has a substantially cylindrical profile and serves the purpose of connecting the Side Frame Members. May have any geometrical shape that gives the Frame enough rigidity to operate the stroller and the shopping cart simultaneously. A section of the Bottom Tray can be attached to the top of the Bottom Frame Cross member.

Sizes: May have a preferred diameter of about 0.005 inches to 8 inches; or a more preferred diameter of about 0.125 inches to 6 inches; or the most preferred diameter of about 0.50 inches to 2 inches. May have a preferred length of about 2 inches to 60 inches; or a more preferred length of 6 inches to 48 inches; or the most preferred length of 12 inches to 36 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

22. Locking Pin: has a substantially cylindrical shape and serves the purpose of holding the Shopping Cart Attachment Frame in a locked and secured position. May be incorporated into the internal or external design of the Shopping Cart Attachment Frame.

Sizes: May have a preferred diameter of about 0.005 inches to 8 inches; or a more preferred diameter of about 0.050 inches to 6 inches or the most preferred diameter of about 0.125 inches to 2 inches. May have a preferred length of about 0.125 inches to 6 inches; or a more preferred length of 0.50 inches to 4 inches or the most preferred length of 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

23. Locking Pin Holder: has a substantially round profile and serves the purpose of securing the locking Pin in place. May have different openings throughout its structure for the Locking Pin to mate into allowing the Shopping Cart Attachment Frame to be pivoted and locked into different positions. The Locking Pin Holder May be integrated into the Axle.

Sizes: May have a preferred diameter of about 0.005 inches to 8 inches; or a more preferred diameter of about 0.125 inches to 4 inches; or the most preferred diameter of about 0.750 inches to 2 inches. May have a preferred length of about 0.005 inches to 8 inches long; or a more preferred length of about 0.50 inches to 4 inches long; or the most preferred length of about 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

24. Spring: has a substantially helical profile and serves the purpose of offering resistance to/and returning the Locking Pin, Release Bar and Gripper Doors back to the closed position. The spring is of a sufficient strength to maintain up to 50 lbs. of resistance.

Sizes: May have a preferred diameter of about 0.005 inches to 8 inches; or a more preferred diameter of about 0.050 inches to 6 inches or the most preferred diameter of about 0.125 inches to 1 inch. May have a preferred length of about 0.125 inches to 8 inches; or a more preferred length of 0.250 inches to 6 inches or the most preferred length of 1 inch to 2 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

25. Spring Holder: has a substantially round profile and serves the purpose of holding the Locking Pin and Spring in position. May be integrated into the Design of the handle.

Sizes: May have a preferred diameter of about 0.005 inches to 8 inches; or a more preferred diameter of 0.125 inches to 6 inches; or the most preferred diameter of about 0.250 inches to 1 inch. May have an opening with a preferred diameter of about 0.005 inches to 8 inches. May have a preferred thickness of about 0.005 inches to 8 inches; or a more preferred thickness of about 0.125 inches to 6 inches; or the most preferred thickness of about 0.50 inches to 1 inch.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

26. Push/Pull Cable: has a substantially cylindrical profile and serves the purpose of simultaneously operating the Locking Pin and Gripper doors when the Release Bar is engaged. May be designed to be internal or external of the Frame or a combination thereof. May be incorporated into the internal or external design of the Shopping Cart Attachment Frame.

Sizes: May have a preferred diameter of about 0.005 inches to 8 inches; or a more preferred diameter of about 0.050 inches to 6 inches; or the most preferred diameter of about 0.125 inches to 1 inch. May have a preferred length of about 0.125 inches to 60 inches; or a more preferred length of 0.50 inches to 48 inches; or the most preferred length of 12 inch to 36 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

27. Cable Linkage: Is composed of parts that are joined together and may create a lever, push/pull, or a sliding action and serves the purpose connecting the release Bar to the Push/Pull Cable; connects the Push/Pull Cable to the Locking Pin; connects the Push/Pull Cable to the Gripper Door. The Cable Linkage may allow for all of these above mentioned components to work in conjunction with each other. May be incorporated into the internal or external design of the Shopping Cart Attachment Frame.

Size: The Cable Linkage may be of any conventional size sufficiently strong enough to serve its purpose.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

28. Attachment Gripper: has a substantially cylindrical profile and serve the purpose of connecting the Frame to a conventional shopping cart. The Attachment Gripper also has a means of securing the shopping cart handle. May be a single gripper, multiple grippers or a combination thereof.

Sizes: May have a preferred width of about 0.50 inches to 8 inches; a more preferred width of about 2 inches to 6 inches; or the most preferred width of about 3 inches to 4 inches. May have a preferred height of about 0.50 inches to 8 inches; a more preferred height of about 2 inches to 6 inches; or the most preferred height of about 3 inches to 4 inches. May have a preferred length of about 0.50 inches to 60 inches; a more preferred length of about 2 inches to 36 inches; or the most preferred length of about 3 inches to 6 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

29. Gripper Door: has a substantially elongated profile and serves the purpose of securing the shopping cart handle inside the Gripper Throat.

Sizes: May have a preferred width of about 0.050 inches to 48 inches; a more preferred width of about 0.50 inches to 36 inches; or the most preferred width of about 2 inches to 4 inches. May have a preferred height of about 0.050 inches to 8 inches; a more preferred height of about 0.125 inches to 6 inches; or the most preferred height of about 0.50 inches to 1 inch. May have a preferred length of about 0.50 inches to 8 inches; a more preferred length of about 2 inches to 6 inches; or the most preferred length of about 3 inches to 4 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

30. Gripper Throat: has a substantially cylindrical profile and serves the purpose of holding the shopping cart handle.

Sizes: May have a preferred width of about 0.50 inches to 8 inches; a more preferred width of about 1 inch to 6 inches; or the most preferred width of about 3 inches to 4 inches. May have a preferred height of about 0.50 inches to 8 inches; a more preferred height of about 1 inch to 6 inches; or the most preferred height of about 3 inches to 4 inches. May have a preferred length of about 0.50 inches to 60 inches; a more preferred length of about 2 inches to 36 inches; or the most preferred length of about 3 inches to 6 inches.

31. Pin: has a substantially cylindrical profile and serves the purpose of providing a pivoting point for the Gripper Door.

Sizes: May have a preferred diameter of about 0.005 inches to 8 inches; or a more preferred diameter of about 0.050 inches to 6 inches or the most preferred diameter of about 0.125 inches to 2 inches. May have a preferred length of about 0.005 inches to 6 inches; or a more preferred length of 0.125 inches to 4 inches; or the most preferred length of 0.50 inches to 1 inch.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

32. Condensation Container: has a substantially round profile and serves the purpose of collecting water dripping from the umbrella while in the upright position. May have a larger diameter than the diameter of the umbrella in the closed position.

Sizes: May have a preferred diameter of about 2 inches to 24 inches; or a more preferred diameter of about 4 inches to 12 inches; or the most preferred diameter of about 6 inches to 8 inches. May have a preferred depth of about 0.125 inches to 12 inches; or a more preferred profile of about 2 inches to 8 inches; or the most preferred profile of about 4 inches to 6 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

33. Umbrella Handle: has a substantially cylindrical profile and serves the purpose of providing the Umbrella a means to connect to the Top Tray. May be of any geometrical shape of sufficient strength to support the Umbrella for long periods of time. May be incorporated into the Umbrella's design. May be incorporated into the Condensation Container's design.

Sizes: My have a preferred diameter of about 0.50 inches to 8 inches; or a more preferred diameter of about 1 inch to 6 inches; or the most preferred diameter of about 2 inches to 3 inches. May have a preferred length of about 1 inch to 12 inches; or the more preferred length of about 2 inches to 8 inches; or the most preferred length of about 4 inches to 6 inches.

Materials: can be made out of wood, or of any other sufficiently, light, rigid and strong and non-conductive material such as high strength plastic or a composite, or metal, aluminum, fiberglass, a graphite or carbon-reinforced composite, steel, titanium, a titanium alloy, or any flexible non-conductive material.

34. Swivel Wheel (Prior Art): Can be of any conventional design that allows the stroller's wheels to travel in any given direction and are of sufficient strength to support the stroller.
35. Shopping Cart Handle (Prior Art): Can be of any conventional shopping cart and is of sufficient strength to operate said shopping cart.
36. Shopping Cart (Prior Art): Can be of any conventional design that allows the user to transport merchandize.
37. Umbrella (Prior Art): Can be of any conventional design that protects the user from the elements.
38. Stroller (Prior Art): Can be of any conventional design that allows the user to transport one or multiple children.

While the foregoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method, and examples, but by all embodiments and methods within the scope and spirit of the invention as claimed.

The invention claimed is:

1. An apparatus for attaching a baby stroller to a conventional shopping cart comprising:
   a frame that provides a sufficiently stable framework for the simultaneous operation of said baby stroller and said shopping cart;
   a handle attached to said frame, wherein said handle controls the operation of said apparatus and said baby stroller;
   an attachment gripper attached to said frame for attaching said apparatus to said shopping cart;
   a means for fastening said apparatus to said baby stroller;
   a sheltering means for sheltering said stroller and the operator of said apparatus from weather; and
   a means for collecting condensation dripping from said sheltering means;
   wherein said handle includes release and locking pins, which allow said apparatus to pivot into, and remain locked in, the desired position.

2. An apparatus for attaching a baby stroller to a conventional shopping cart comprising:
   a frame that provides a sufficiently stable framework for the simultaneous operation of said baby stroller and said shopping cart;
   a handle attached to said frame, wherein said handle controls the operation of said apparatus and said baby stroller;
   an attachment gripper attached to said frame for attaching said apparatus to said shopping cart;
   a means for fastening said apparatus to said baby stroller;
   a sheltering means for sheltering said stroller and the operator of said apparatus from weather; and
   a means for collecting condensation dripping from said sheltering means;
   wherein said frame comprises at least one top frame cross member and at least one bottom frame cross member, which provide rigidity to said frame.

3. An apparatus for attaching a baby stroller to a conventional shopping cart comprising:
   a frame that provides a sufficiently stable framework for the simultaneous operation of said baby stroller and said shopping cart;
   a handle attached to said frame, wherein said handle controls the operation of said apparatus and said baby stroller;
   an attachment gripper attached to said frame for attaching said apparatus to said shopping cart;
   a means for fastening said apparatus to said baby stroller;
   a sheltering means for sheltering said stroller and the operator of said apparatus from weather; and
   a means for collecting condensation dripping from said sheltering means;
   wherein said frame further comprises a top tray as a means of securing said apparatus to said baby stroller.

4. A baby stroller comprising:
   a seat;
   a frame;
   a handle;
   at least 3 wheels;
   a means for attaching said baby stroller to a conventional shopping cart;
   a means for sheltering said stroller and the operator of said apparatus from weather; and
   a means for collecting condensation dripping from said sheltering means;
   wherein the means for attaching said baby stroller to said conventional shopping cart comprises
   a frame that provides a sufficiently stable framework for the simultaneous operation of said baby stroller and said shopping cart;
   a handle attached to said frame, wherein said handle controls the operation of said baby stroller and said shopping cart; and wherein said handle includes release and locking pins, which allow said frame to pivot into, and remain locked in the desired position; and
   an attachment gripper attached to said frame for attaching said baby stroller to said shopping cart.

5. A baby stroller comprising:
   a seat;
   a frame;
   a handle;
   at least 3 wheels;
   a means for attaching said baby stroller to a conventional shopping cart;
   a means for sheltering said stroller and the operator of said apparatus from weather; and
   a means for collecting condensation dripping from said sheltering means;
   wherein the means for attaching said baby stroller to said conventional shopping cart comprises
   a frame that provides a sufficiently stable framework for the simultaneous operation of said baby stroller and said shopping cart, wherein said frame comprises at least one top frame cross member and at least one bottom frame cross member, which provide rigidity to said frame;
   a handle attached to said frame, wherein said handle controls the operation of said baby stroller and said shopping cart; and
   an attachment gripper attached to said frame for attaching said baby stroller to said shopping cart.

6. A baby stroller comprising:
   a seat;
   a frame;
   a handle;
   at least 3 wheels;
   a means for attaching said baby stroller to a conventional shopping cart;
   a means for sheltering said stroller and the operator of said apparatus from weather; and a means for collecting condensation dripping from said sheltering means;
wherein the means for attaching said baby stroller to said conventional shopping cart comprises
a frame that provides a sufficiently stable framework for the simultaneous operation of said baby stroller and said shopping cart, wherein said frame further comprises a top tray as a means of securing said apparatus to said baby stroller;
a handle attached to said frame, wherein said handle controls the operation of said baby stroller and said shopping cart; and
an attachment gripper attached to said frame for attaching said baby stroller to said shopping cart.

\* \* \* \* \*